United States Patent
Aderholt et al.

(10) Patent No.: US 6,742,538 B1
(45) Date of Patent: Jun. 1, 2004

(54) METHOD AND APPARATUS FOR ORBITAL AND SEAL WELDED RELIEF DEVICE ON A COMPRESSED GAS CYLINDER

(75) Inventors: Steven K. Aderholt, Amarillo, TX (US); Franklin B. Piehl, Bushland, TX (US); Dennis C. Hatfield, Amarillo, TX (US)

(73) Assignee: Western Valve, Amarillo, TX (US)

( * ) Notice: Subject to any disclaimer, the term of this patent is extended or adjusted under 35 U.S.C. 154(b) by 69 days.

(21) Appl. No.: 10/141,413

(22) Filed: May 8, 2002

Related U.S. Application Data (60) Provisional application No. 60/373,902, filed on Apr. 19, 2002, and provisional application No. 60/373,863, filed on Apr. 19, 2002.

(51) Int. Cl.[7] ........................... F16K 17/16; F16K 17/38
(52) U.S. Cl. ................. 137/68.12; 137/68.23; 137/69; 137/74; 220/89.2; 220/89.4
(58) Field of Search ................ 137/68.12, 68.19, 137/69, 74, 68.23, 72; 220/89.1, 89.2, 89.4

(56) References Cited

U.S. PATENT DOCUMENTS

| | | | |
|---|---|---|---|
| 1,068,675 A | | 7/1913 | Lightfoot |
| 1,951,926 A | | 9/1934 | Davidson |
| 2,213,878 A | | 9/1940 | Boyle |
| 2,383,961 A | | 9/1945 | Freygang |
| 2,552,110 A | * | 5/1951 | Otis et al. .................. 220/89.2 |
| 2,662,546 A | | 12/1953 | Nelson |
| 3,064,854 A | * | 11/1962 | Miller ........................ 220/89.2 |
| 3,404,698 A | | 10/1968 | Rouse |
| 3,618,626 A | | 11/1971 | Russo |
| 4,077,422 A | | 3/1978 | Brinkley et al. |
| 4,102,167 A | * | 7/1978 | Wood et al. .................... 72/54 |
| 4,269,214 A | | 5/1981 | Forsythe |
| 4,907,617 A | | 3/1990 | Whalen |
| 4,944,424 A | | 7/1990 | Wood, Jr. |
| 5,022,423 A | | 6/1991 | Britt |
| 5,048,554 A | * | 9/1991 | Kremer ........................ 137/69 |
| 5,103,853 A | | 4/1992 | McGushion et al. |
| 5,160,065 A | | 11/1992 | Libes et al. |
| 5,832,947 A | | 11/1998 | Niemczyk |
| 6,142,346 A | | 11/2000 | Aderholt |

* cited by examiner

*Primary Examiner*—John Rivell
(74) *Attorney, Agent, or Firm*—Strasburger & Price; David G. Moore; Alan R. Thiele (57) ABSTRACT

A relief device for a high-pressure gas container, comprising a main body having a generally uniform outer circumference and that defines a primary bore, the primary bore in fluid communication with an interior volume of the high-pressure gas container, the main body having a secondary bore, the secondary bore located within the outer circumference and in fluid communication with the primary bore, a spud assembly seated in the secondary bore, the spud assembly including a rupture disc that relieves to the atmosphere the contents of the container when the container reaches a certain pressure, the rupture disc located within the secondary bore and within the outer circumference, the spud assembly and rupture disc fixedly attached.

The relief device further includes a shear ring in communication with the rupture disc and a plug in communication with the spud assembly, the plug, when engaged with the spud assembly, forcibly engaging the shear ring against the rupture disc, wherein, when the rupture disc expands, the shear ring ruptures the rupture disc and the contents of the container relieve to the atmosphere through the plug.

12 Claims, 6 Drawing Sheets

METHOD AND APPARATUS FOR ORBITAL AND SEAL WELDED RELIEF DEVICE ON A COMPRESSED GAS CYLINDER

CROSS-REFERENCE TO RELATED APPLICATIONS

This application claims the priority benefit of U.S. Provisional Application for Patent, Serial No. 60/373,863, entitled "Orbital and Seal Welded Relief Device on Non-Fill End of a Compressed Gas Cylinder", filed Apr. 19, 2002, by Aderholt et al., and claims the priority benefit of U.S. Provisional Application for Patent, Serial No. 60/373,902, entitled "Orbital and Seal Welded Relief Device on Fill End of a Compressed Gas Cylinder", filed Apr. 19, 2002, by Aderholt et al., both of which are hereby incorporated by reference for all purposes.

STATEMENT REGARDING FEDERALLY SPONSORED RESEARCH/DEVELOPMENT

Not Applicable

FIELD OF THE INVENTION

The present invention relates generally to relief devices for tanks containing high-pressure gases. More specifically, the present invention relates to relief devices for truck-borne compressed gas cylinders.

BACKGROUND

Various types of compressed gases are commonly transported in long, narrow cylinders, or "tubes," mounted directly on a tractor trailer chassis or in a "module," or a box frame containing the cylinders that is loaded onto a flat bed trailer. These truck-borne compressed gas cylinders are often required by law to be fitted with relief devices designed to relieve pressure from the compressed gas cylinders in the event of cylinder over-pressurization or fire. These relief devices are typically attached to each end of a cylinder and take two major forms: cluster-type relief devices (typically for hazardous gases) and angle-type relief devices (typically for non-hazardous gases). The present patent application deals with an improved form of an angle-type relief device.

In U.S. Pat. No. 5,832,947, entitled "Gas Shut-Off and Pressure Relief Valve for a High Pressure Gas Vessel," issued to Andrew Niemczyk, a pressure relief valve is disclosed. The disclosed pressure relief valve has a threaded body that engages the side port in fluid communication with the gas passage. The side port has a radially extending shoulder that seats an annular sealing ring. A rupture disc, made from brass, is pressed by the threaded body against the sealing ring. During operation, the rupture disc is strong enough to withstand normal gas pressures. Pressure from the threaded body on the sealing ring provides non-leak support. At high pressures, the rupture disc will deform and rip and allow for the venting of the gas.

In U.S. Pat. No. 4,269,214, entitled "Safety Pressure Relief Device," issued to Calvin. C. Forsythe, et al., a safety pressure relief device is disclosed. The disclosed safety pressure relief device has a casing with a threaded connection and a concentric axial bore therethrough. The open end of the casing engages a concave-convex rupture disc which is ruptured with a knife means including a plurality of spaced cutting teeth. An annular outlet ring is connected to the casing by a continuous heli-arc weld. The weld also connects the rupture disc and the knife means to the casing.

Figure 1:
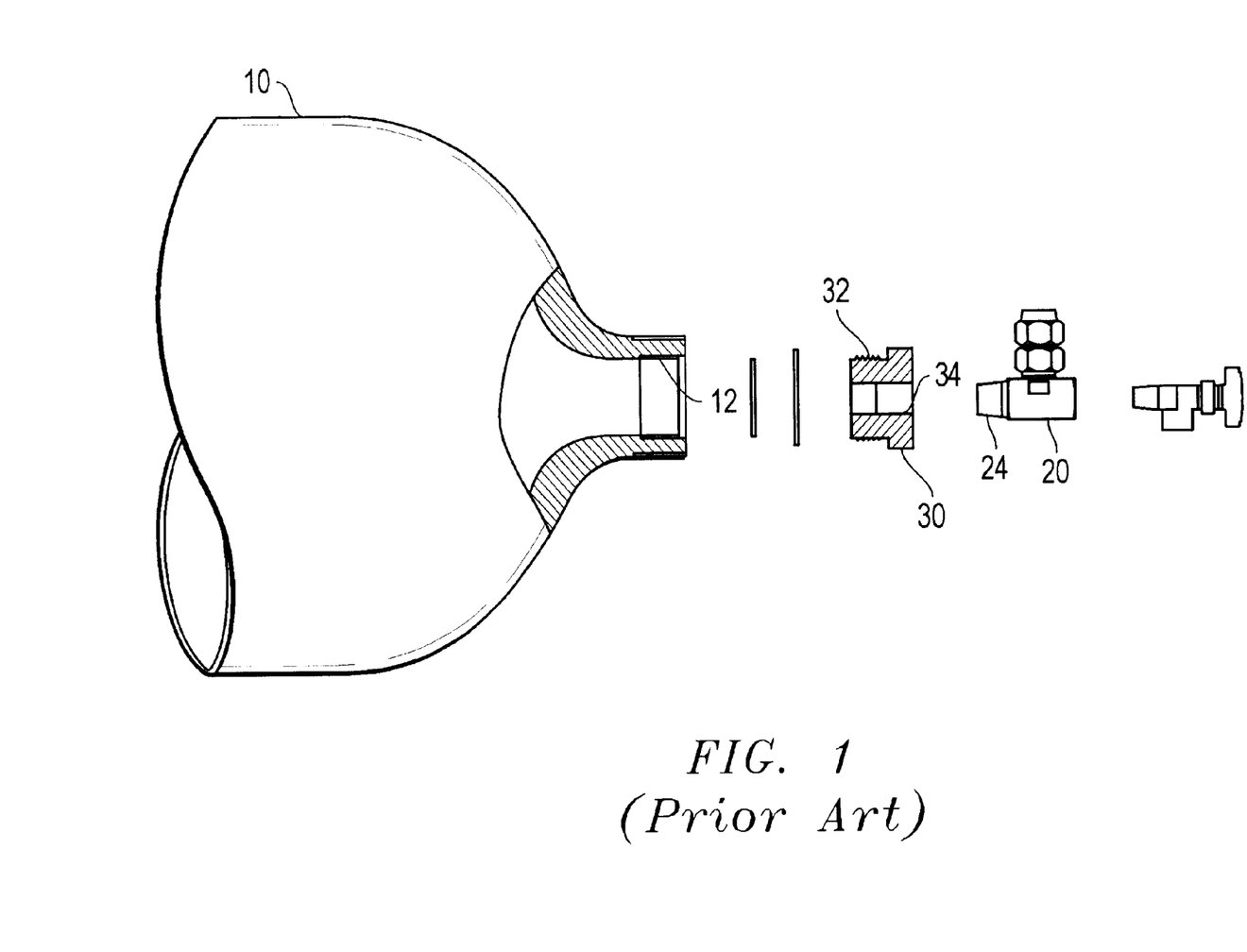
FIG. 1 is an exploded view of a prior art angle-type relief device's interaction with its associated compressed gas cylinder.
Figure 2:
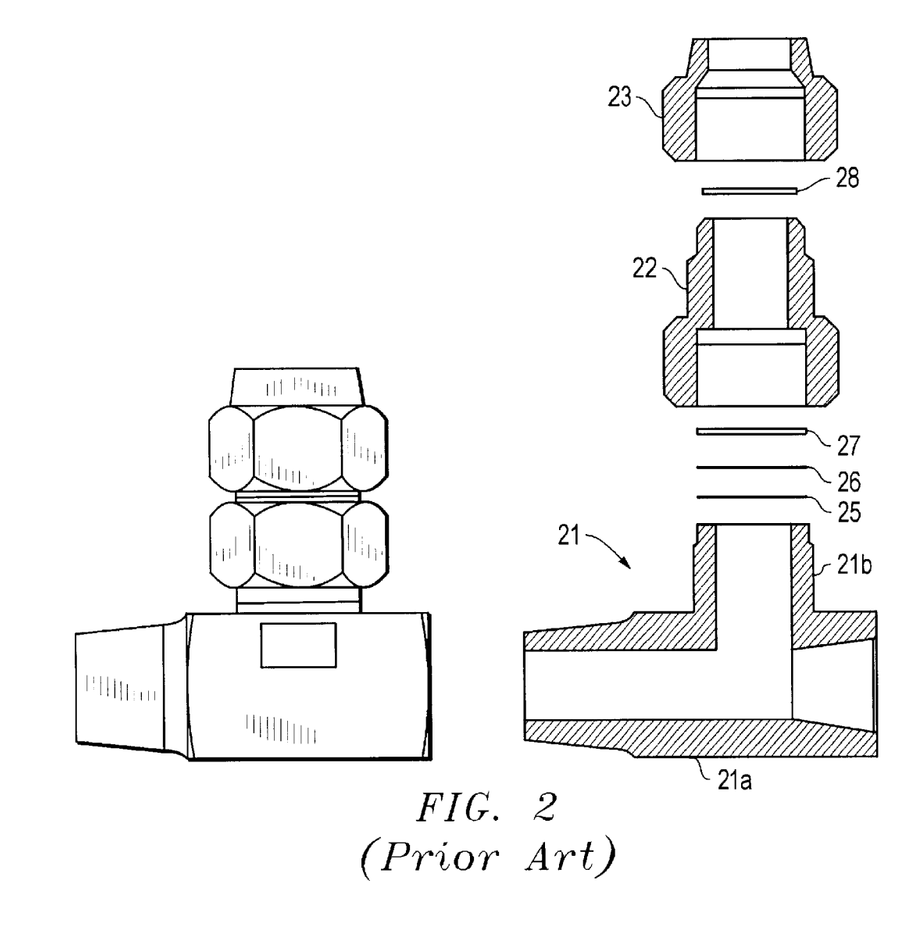
FIG. 2 is a close up exploded view of a prior art angle-type relief device.

FIG. 1 illustrates another prior art angle-type relief device and its attachment to a compressed gas cylinder. FIG. 2 is an exploded view of a prior art angle-type relief device. As shown in FIG. 1, the relief device 20 does not attach directly to the cylinder 10. Rather, the relief device 20 screws into a "bullplug" 30, which itself screws into the cylinder 10. Thus, the bullplug has two sets of threads: a set of male straight threads 32 that engage a reciprocal female set 12 in the cylinder; and a set of female pipe threads 34 that engage a reciprocal set of male pipe threads 24 on the relief device 20. Each set of threads on the bullplug represents a potential leak or failure point. Moreover, having the relief device screw into the bullplug, which in turn screws into the cylinder, means that the relief device protrudes farther from the cylinder than it would if the relief device screwed directly into the cylinder. This greater protrusion presents a greater opportunity for a shear of the relief device from the cylinder in the event of an accident, resulting in uncontrolled compressed gas leakage.

As shown in FIG. 2, the relief device comprises a valve body 21 and a washer 25, rupture disc 26, shear ring 27, adapter 22, membrane 28, and flare nut 23. The valve body comprises a main body coaxial with its associated compressed gas cylinder and an integral riser portion having an axis perpendicular to the main axis and the cylinder axis. The operation of the angle-type relief device is described below—prior art angle-type relief devices and the present invention operate to relieve pressure in essentially the same manner.

FIG. 2 illustrates how the riser portion 21b protrudes beyond the outer diameter of the relief device main body 21a. This presents yet another opportunity for shear in the event of an accident, in this case the shear of the riser and the rupture disc away from the main body. As FIG. 2 illustrates, in the event of a riser portion shear, the rupture disc, adapter, and flare nut will separate from the main body, creating an unobstructed flow path from the cylinder through the main body and on through to the atmosphere through the sheared riser portion.

Therefore, a need exists for an angle-type relief device that couples directly to its associated compressed gas tank, rather than via a bullplug, thereby lessening the likelihood of 1) leakage past a threaded connection, and 2) relief device shear—and the associated uncontrolled leakage—in the event of an accident. Furthermore, a need exists for an angle-type relief device without a riser and associated rupture disc that protrude beyond the diameter of the device's main body, and the consequent increased likelihood of riser shear and the associated premature and uncontrolled relief.

Accordingly, it is an object of the present invention to provide an angle-type relief device for compressed gas cylinders that attaches directly to its cylinder rather than threading into a bullplug. It is a further object of this invention to provide an angle-type relief device for compressed gas cylinders that reduces or eliminates the likelihood of the rupture disc shearing away from the main body in the event of an accident. Thus, the present invention features a larger diameter threaded connection that may be threaded directly into the cylinder in place of a bullplug. Moreover, the present invention's rupture disc is recessed into the relief device main body, thereby greatly reducing or eliminating the chance of accidental shear. It is a further object of the invention to deduce and eliminate the leak path of the gas in the cylinder. Thus, the present invention features two welds, first the orbital rupture disk is welded to the spud assembly and second, the spud assembly is welded to the relief device.

SUMMARY

The present invention is a relief device for a high-pressure gas container, comprising a main body having a generally uniform outer circumference that defines a bore. The bore is in fluid communication with an interior volume of the high-pressure gas container. Within the bore is a relief device—typically a rupture disc—that relieves to the atmosphere the container's contents when the container reaches a certain pressure. The relief device is coupled to the high-pressure gas container via a threaded connection on the container.

In one disclosed embodiment, the bore comprises a primary bore coaxial with the main body's main axis, and a secondary bore in fluid communication with the primary bore containing the rupture disc. The secondary bore and rupture disc are each located within the main body's outer circumference. A spud assembly and a non-vent plug retain the rupture disc within the secondary bore. The non-vent plug has a bore which is in fluid communication with the secondary bore when the rupture disc is ruptured. Depending upon the gas in the container, the non-vent plug bore may be filled with a fuse metal, which is designed to melt at a pre-determined temperature, and that allows container relief in the event of bursting of the rupture disc.

A shear ring between the non-vent plug and the rupture disc facilitates the rupturing of the rupture disc.

BRIEF DESCRIPTION OF THE DRAWINGS

For a more complete understanding of the present invention, and for further details and advantages thereof, reference is now made to the following Detailed Description taken in conjunction with the following drawings, in which.

DETAILED DESCRIPTION OF THE INVENTION

In the descriptions which follow, like parts are marked throughout the specification and drawings with the same numerals, respectively. The drawing figures are not necessarily drawn to scale and certain figures may be shown in exaggerated or generalized form in the interest of clarity and conciseness.

The present invention comprises generally a main body having an outer circumference, a threaded connection for coupling the main body to a compressed gas cylinder, and a rupture disc that ruptures and relieves container pressure in the event of an over-pressure event or fire. This disclosure describes numerous specific details that include specific structures, their arrangement, and functions in order to provide a thorough understanding of the present invention. One skilled in the art will appreciate that one may practice the present invention without these specific details.

An improved angle-type relief device for truck-borne high pressure gas cylinders directly engages the cylinder. A bore within the main body of the relief device is in fluid communication with the cylinder contents. When cylinder pressure reaches a predetermined level, a rupture disc within the relief device ruptures, allowing the cylinder contents to escape and the cylinder to depressive. The rupture disc is contained within the outer circumference of the essentially uniformly shaped main body, such that the likelihood of the rupture disc shearing away—and releasing the cylinder contents—is minimized in the event of an accident.

Figure 3:
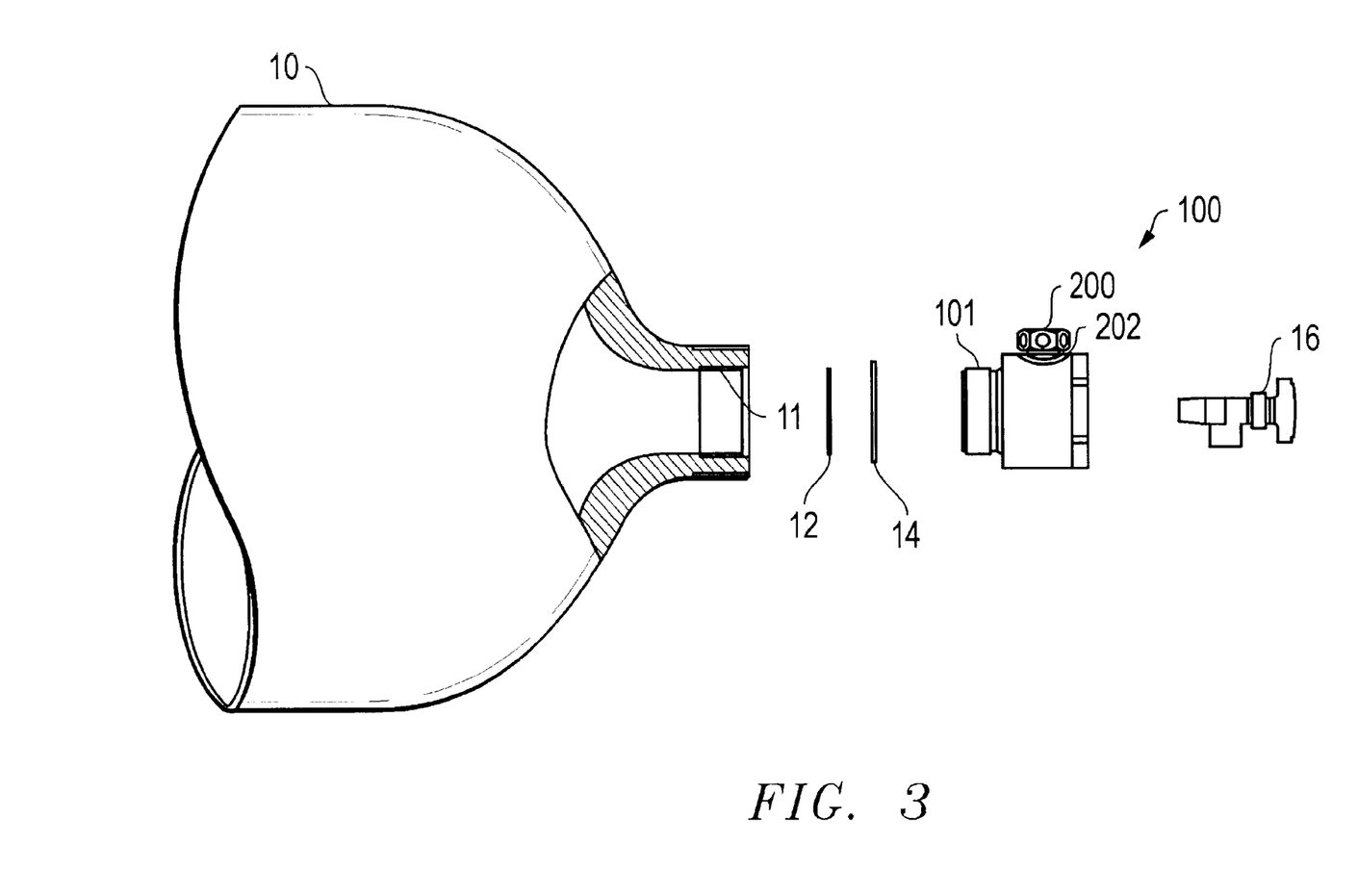
FIG. 3 is an exploded view of one embodiment of the present invention's interaction with its associated compressed gas cylinder.
Figure 4:
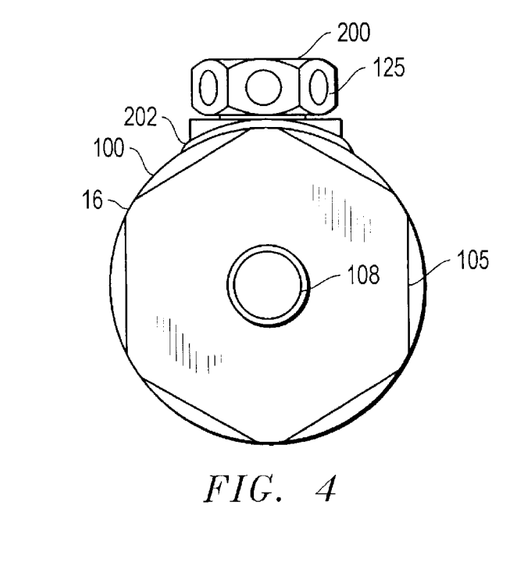
FIG. 4 is an end view of the bullplug of one embodiment of the present invention.
Figure 5:
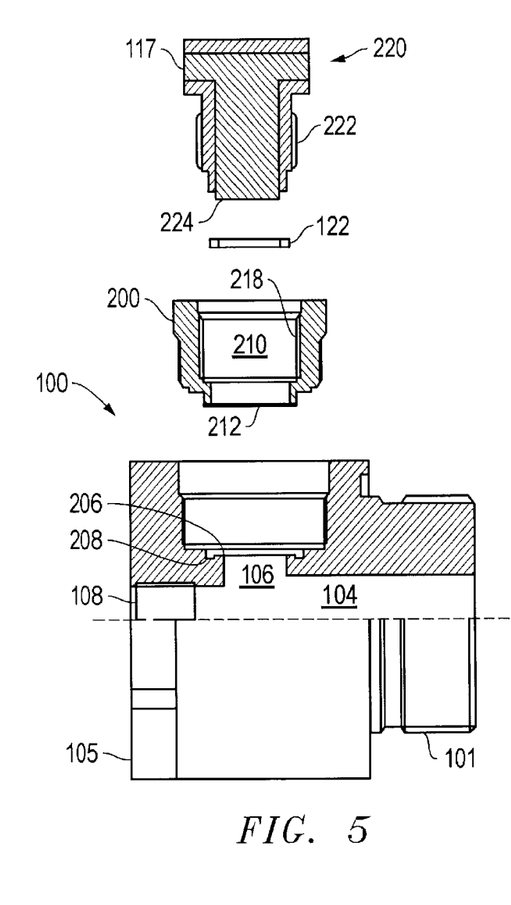
FIG. 5 is a close up exploded and partial cutaway view of one embodiment of the present invention.

Referring now to the figures, FIG. 3 is an exploded view of one embodiment of the interaction of the present invention's angle-type relief device 100 with its associated compressed gas cylinder 10. As shown in FIGS. 3, 4 and 5, the present invention has large male straight threads 101 that screw directly into the female straight threads 11 of the compressed gas cylinder 10. "O" ring 12 (typically made of rubber) and backup ring 14 (typically made of a synthetic, fluorine-containing resin such as TEFLON) help to create a seal between device 100 and cylinder 10. Valve 16 threads into the downstream side of device 100, allowing the operator to manually control gas flow from the cylinder. This configuration is typically called a "Fill end" configuration. Spud assembly 200 is of fixedly attached to device 100. In one disclosed embodiment, the spud assembly is welded 202 to the device 100 which alleviates the leak path of gas from the device 100. However, a variety of various attachment techniques are available without detracting from the spirit of the invention.

FIG. 5 illustrates the bullplug relief device itself. The device's 100 main body has male straight threads 101 that mate with corresponding female threads 11 in the compressed gas cylinder 10. Flat surfaces 105 provide a way to engage a wrench or similar tool for torquing the device 100 to the cylinder 10. The device 100 has a primary bore 104 concentric with its axis and a secondary bore 106 perpendicular to the device's 100 main axis. The primary bore 104 extends from the upstream end of device 100, the end closest to the gas cylinder 10, through to the secondary bore 106 to the valve 16. The primary and secondary bores 104 and 106 are in fluid communication with one another. Coaxial with the primary bore 104, and extending from the downstream end of the main body is a hole 108 tapped with the female pipe threads to accept a valve 16 (shown in FIG. 3) or a plug (not shown).

The secondary bore 106 is bored to multiple different diameters: The first inner, smaller diameter portion of the secondary bore 106 is in fluid communication with main bore 104 and provides a flow path from the primary bore 104. The second inner, larger diameter portion of the secondary bore 106 is also in fluid communication with the main bore 104 and the first inner diameter portion and forms a flat annular surface 206 at the transition between the first and second diameter bores. A recessed portion 208 of this surface is provided at the outer edge of the second, inner diameter portion. A first outer, larger diameter portion of the secondary bore 106 accepts the spud assembly 200. A second outer, larger diameter portion of the secondary bore 106 is in fluid communication with the inner diameter portions and the first outer portion.

The spud assembly 200 includes a bore 210 through the axis of the spud assembly 200. The spud assembly 200 is seated inside the secondary bore 106 of the device 100. Once the spud assembly 200 is seated in the bore 106, the spud assembly 200 is permanently attached to the device 100. In one disclosed embodiment, the spud assembly 200 is welded 202 to the device 100 which alleviates the leak path of gas. The spud assembly 200 includes three outer diameters that correspond to the first and second outer diameters and second inner diameter of the secondary bore 106. The bore 210 is bored to three different diameters: The first inner spud diameter portion is bored to a diameter smaller than the diameter of the second inner diameter of the secondary bore 106, but larger than the first inner diameter. The width of the shell of the first inner spud diameter portion corresponds to the width of the recess portion 208 of the annular surface 206 such that shell of the first inner spud diameter portion engages the recessed area 208. The spud assembly 200 further includes first and second outer spud diameter portions of the bore 210. The second outer spud diameter portion is in fluid communication with the first outer spud diameter portion and the first inner spud diameter portion.

A rupture disc 212 is fixedly attached to the bottom edge of the spud assembly 200 and has a diameter corresponding with the width of the shell of the first inner spud diameter portion. In one disclosed embodiment, the rupture disc 212 is orbital welded to the spud assembly 200. However, a variety of various attachment techniques are available without detracting from the spirit of the invention. The rupture disc 212 is a disc made of different metals depending upon the gas contained in the cylinder. For example, a cylinder containing compressed hydrogen chloride gas (HCl) will have a rupture disc made of platinum. The rupture disc 212 is designed to burst at a given pressure called a "burst pressure." The design burst pressure will vary depending upon the volume, pressure, and type of compressed gas contained in the cylinder. Moreover, the burst pressure is affected by extreme heat. Thus, in the event of a fire, the disc will burst at some pressure less than its design burst pressure. When the cylinder pressure reaches the burst pressure, the rupture disc ruptures and allows the gas to escape through the spud assembly 200.

A shear ring 122 rests on top of rupture disc 212. Shear ring 122 facilitates the rupture of rupture disc 212 during an over pressurization event by providing a sharp "corner" around the inside of the rupture disc's circumference. The shear ring 122 is seated inside the first inner spud diameter portion and rests upon the rupture disc 212. The shear ring 122 is compressed against the rupture disc 212 and the annular surface 206 of the device 100 by a non-vent plug 220. The non-vent plug 220 has male threads 222 that engage the female threads 218 of the spud assembly 200. When non-vent plug 220 is threaded onto the spud assembly, it compresses rupture disc 212 and the shear ring 122 between annular surface 206 and a bottom surface 224 of the non-vent plug 220. The bore 210 is bored through the axis of the spud assembly 200 and the non-vent plug 220 is bored through its axis coaxial with bore 106, providing a flowpath from the device 100 to the atmosphere. The non-vent plug 220 bore can be filled with a fuse metal 117, which is discussed herein, or can be left unfilled (not shown) as is disclosed in this embodiment. Flat surface 125 provides a means for engaging a wrench or other similar tool when torquing the non-vent plug 220. In an alternative embodiment of the present invention, fuse metal 117 is included in the non-vent plug 220. Depending upon the gas contained in the cylinder, and typically when the gas is particularly poisonous or corrosive, the non-vent plug 220 may be filled with a fuse metal 117. A fuse metal is a low melting-point metallic alloy that is designed to melt at a given temperature, typically either 165° F. or 212° F. The melting temperature is dictated by industry and government standards depending upon the application. Examples of 165° F. applications include air, argon, carbon dioxide, and chlorine. Examples of 212° F. applications include ethane and sulfur hexafluoride. Thus, in the event of a fire the fuse metal will melt away, clearing a flowpath—interrupted only by the rupture disc—from the device's main axial bore through the spud assembly 200 and non-vent plug 220 directly to the atmosphere. When the cylinder pressure exceeds the rupture disc's burst pressure (which may be reduced by the heat), and the fuse metal is melted away, the compressed gas is relieved from the cylinder.

The relief device body, spud assembly, and non-vent plug are typically manufactured from the same material. The material will vary depending upon the application. For example, for an HCl application carbon steel is used. High purity gases requiring a low particle count, such as many refrigerants, require stainless steel, such as 304 or 316 stainless steel.

In another embodiment, the present invention is a relief device for a high-pressure gas container, comprising a main body having a generally uniform outer circumference that defines a bore. The bore is in fluid communication with an interior volume of the high-pressure gas container. Within the bore is a rupture disc for relieving to the atmosphere the container's contents when the container reaches a certain pressure. The relief device is coupled to the high-pressure gas container via a threaded connection.

In this embodiment, as shown in FIGS. 6–9, an improved angle-type relief device for truck-borne high pressure gas cylinders directly engages the cylinder. A bore within the main body of the relief device is in fluid communication with the cylinder contents. When cylinder pressure reaches a predetermined level, a rupture disc within the relief device ruptures, allowing the cylinder contents to escape and the cylinder to depressurize. The rupture disc is contained within the outer circumference of the essentially uniformly shaped main body, such that the likelihood of the rupture disc shearing away—and releasing the cylinder contents—is minimized in the event of an accident.

Figure 6:
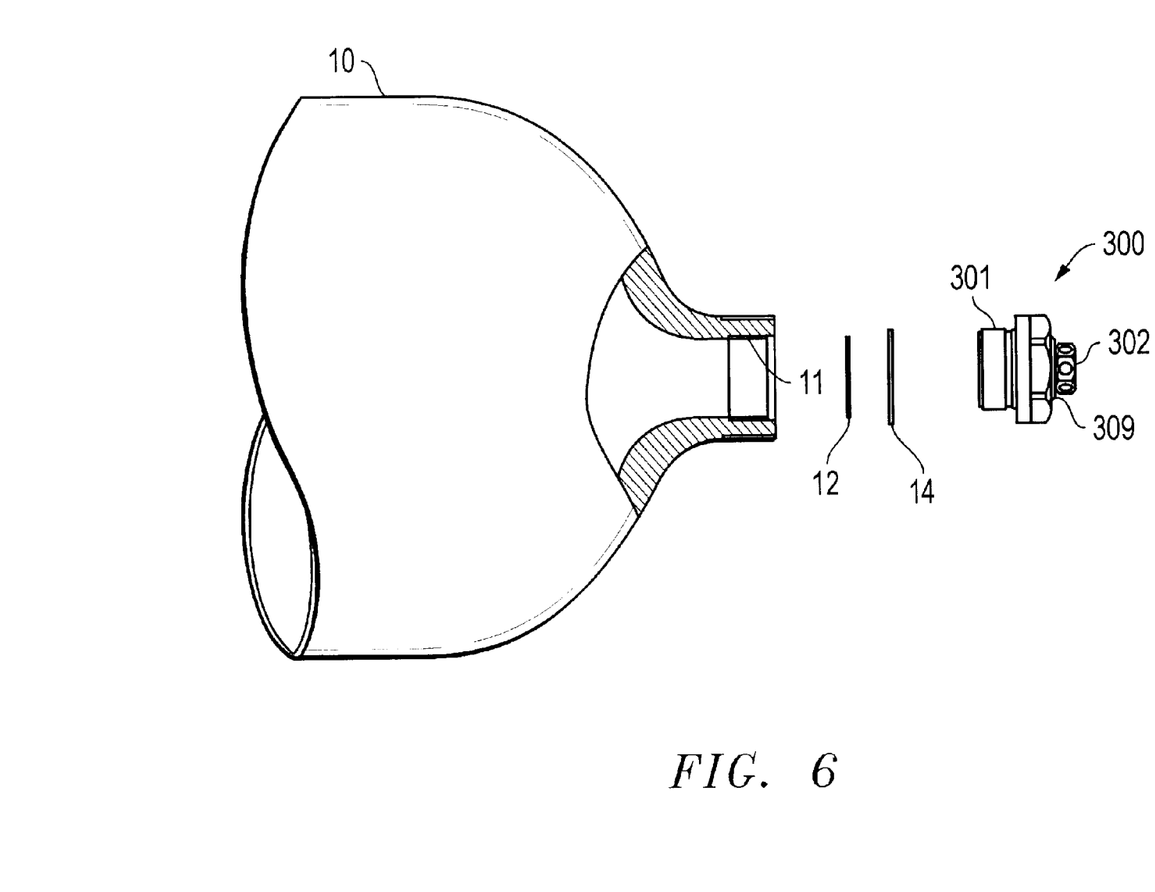
FIG. 6 is an exploded view of a second embodiment of the present invention's interaction with its associated compressed gas cylinder.

Referring now to the figures, FIG. 6 is an exploded view of the interaction of the present invention's bullplug relief device 300 with its associated compressed gas cylinder 10. This configuration is typically called a "Non-Fill end" configuration. As shown in FIGS. 6–9, the present invention has large male straight threads 301 that screw directly into the female straight threads 11 of the compressed gas cylinder 10. "O" ring 12 (typically made of rubber) and backup ring 14 (typically made of a synthetic, fluorine-containing resin such as TEFLON) help to create a seal between device 300 and cylinder 10. Spud assembly 302 is fixedly attached to device 300. In one disclosed embodiment, the spud assembly 302 is welded 309 to the device 300 which alleviates the leak path of gas from the device 300. However, a variety of various attachment techniques are available without detracting from the spirit of the invention.

Figure 7:
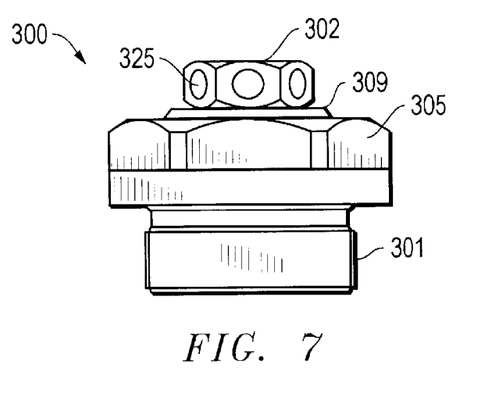
FIG. 7 is a side view of the bullplug of a second embodiment of the present invention.
Figure 8:
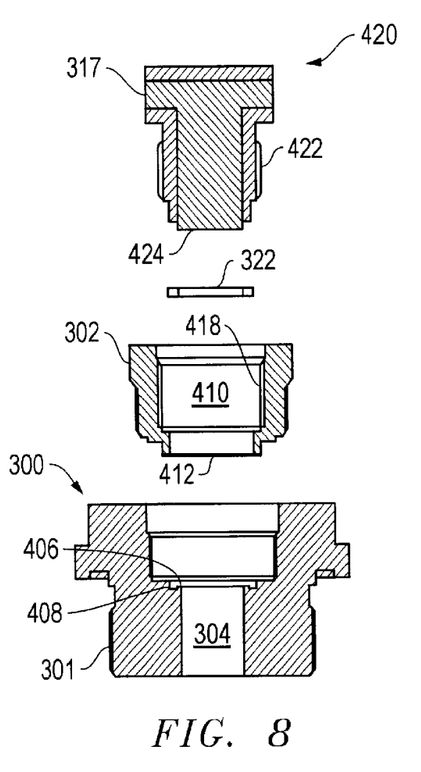
FIG. 8 is a close up exploded and partial cutaway view of a second embodiment of the present invention.
Figure 9:
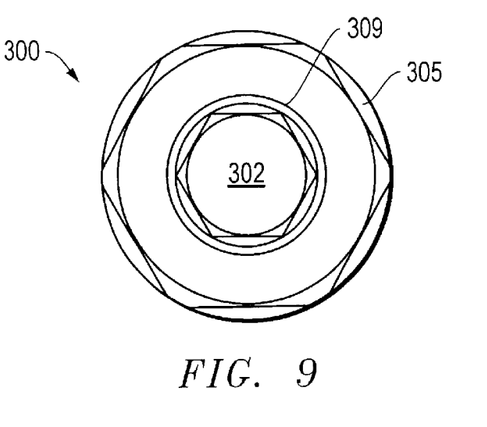
FIG. 9 is an end view of the bullplug of a second embodiment of the present invention.

FIGS. 7–9 illustrates the bullplug relief device itself. The device's 300 main body has male straight threads 301 that mate with corresponding female threads 11 in the compressed gas cylinder 10. Flat surfaces 305 provide a way to engage a wrench or similar tool for torquing the device 300 to the cylinder 10. The device 300 has a primary bore 304 concentric with its axis. The primary bore 304 extends from the upstream end of device 300, the end closest to the gas cylinder 10, through to the spud assembly 302. The primary bore 304 is in fluid communication with the cylinder 10 contents.

The primary bore 304 is bored to multiple different diameters: The first inner, smaller diameter portion of the primary bore 304 is in fluid communication with the cylinder 10 and provides a flow path. The second inner, larger diameter portion of the primary bore 304 is also in fluid communication with the first inner diameter portion and forms a flat annular surface 406 at the transition between the first and second diameter bores. A recessed portion 408 of this surface is provided at the outer edge of the second, inner diameter portion. A first outer, larger diameter portion of the primary bore 304 accepts the spud assembly 302. A second outer, larger diameter portion of the primary bore 304 is in fluid communication with the inner diameter portions and the first outer portion.

The spud assembly 302 includes a bore 410 through the axis of the spud assembly 302 which is coaxial with the primary bore 304. The spud assembly 302 is seated inside the primary bore 304 of the device 300. The spud assembly 302 includes three outer diameters that correspond to the first and second outer diameters and second inner diameter of the primary bore 304. The bore 410 is bored to three different diameters: The first inner spud diameter portion is bored to a diameter smaller than the diameter of the second inner diameter of the primary bore 304, but larger than the first inner diameter. The width of the shell of the first inner spud diameter portion corresponds to the recess portion 408 of the annular surface 406 such that shell of the first inner spud diameter portion engages the recessed area 408. The spud assembly 302 further includes a first and second outer spud diameter portion of the bore 410. The second outer spud diameter portion is in fluid communication with the first outer spud diameter portion and the first inner spud diameter portion.

A rupture disc 412 is permanently attached to the bottom edge of the spud assembly 302 and has a diameter corresponding with the width of the shell of the first inner spud diameter portion. In one disclosed embodiment, the rupture disc 412 is orbital welded to the spud assembly 302. However, a variety of various attachment techniques are available without detracting from the spirit of the invention. The rupture disc 412 is a disc made of different metals and performs as discussed previously herein.

A shear ring 322 rests on top of rupture disc 412. Shear ring 322 facilitates the rupture of the rupture disc 412 during an over pressurization event by providing a sharp "corner" around the inside of the disc's circumference. The shear ring 322 is seated inside the first inner spud diameter portion and rest upon the rupture disc 412. The shear ring 322 is compressed against the rupture disc 412 and the annular surface 406 of the device 300 by a non-vent plug 420. The non-vent plug 420 has male threads 422 that engage the female threads 418 of the spud assembly 302. When non-vent plug 420 is threaded onto the spud assembly, it compresses the rupture disc 412 and the shear ring 322 between annular surface 406 and a bottom surface 424 of the non-vent plug 420. The bore 410 is bored through the axis of the spud assembly 302 and the non-vent plug 420 is bored through its axis coaxial with bore 304, providing a flowpath from the device 300 to the atmosphere. The non-vent plug 420 bore can be filled with a fuse metal 317, which is discussed herein, or can be left unfilled (not shown) as is disclosed in this embodiment. Flat surface 325 provides a means for engaging a wrench or other similar tool when torquing the non-vent plug 420. Once the spud assembly 302 is seated, the spud assembly 302 is permanently attached to the device 300. In one disclosed embodiment, the spud assembly 302 is welded 309 to the device 300 which alleviates the leak path of gas. However, a variety of various attachment techniques are available without detracting from the spirit of the invention.

In an alternative embodiment of the present invention, fuse metal 317 is included in the non-vent plug 420. Depending upon the gas contained in the cylinder, and typically when the gas is particularly poisonous or corrosive, the non-vent plug 420 may be filled with a fuse metal 317. A fuse metal is a low melting-point metallic alloy that is designed to melt at a given temperature, typically either 165° F. or 212° F. The melting temperature is dictated by industry and government standards depending upon the application. Examples of 165° F. applications include air, argon, carbon dioxide, and chlorine. Examples of 212° F. applications include ethane and sulfur hexafluoride. Thus, in the event of a fire the fuse metal will melt away, clearing a flowpath—interrupted only by the rupture disc—from the device's main axial bore through the spud assembly 302 and non-vent plug 420 directly to the atmosphere. When the cylinder pressure exceeds the rupture disc's burst pressure (which may be reduced by the heat), and the fuse metal is melted away, the compressed gas is relieved from the cylinder.

The relief device body, spud assembly, and non-vent plug are typically manufactured from the same material. The material will vary depending upon the application. For example, for an HCl application carbon steel is used. High purity gases requiring a low particle count, such as many refrigerants, require stainless steel, such as 304 or 316 stainless steel.

Other embodiments of the invention will be apparent to those skilled in the art after considering this specification or practicing the disclosed invention. The specification and examples above are exemplary only, with the true scope of the invention being indicated by the following claims.

We claim the following invention:

1. A relief device for a high-pressure gas container, comprising:

a main body having a generally uniform outer circumference and that defines a primary bore, the primary bore in fluid communication with an interior volume of the high-pressure gas container;

the main body having a secondary bore, the secondary bore located within the outer circumference and in fluid communication with the primary bore;

a spud assembly seated in the secondary bore, the spud assembly including a rupture disc that relieves to the atmosphere the contents of the container when the container reaches a certain pressure, the rupture disc located within the secondary bore and within the outer circumference, the spud assembly and rupture disc fixedly attached;

a shear ring in communication with the rupture disc; and a plug in communication with the spud assembly, the plug, when engaged with the spud assembly, forcibly engaging the shear ring against the rupture disc;

wherein, when the rupture disc expands, the shear ring ruptures the rupture disc and the contents of the container relieve to the atmosphere through the plug; and wherein the main body and spud assembly are welded.

2. The relief device of claim 1 wherein the rupture disc and spud assembly are welded.

3. The relief device of claim 1 wherein the primary bore and the secondary bore are perpendicular.

4. The relief device of claim 1 wherein the primary bore is concentric with the main axis of the relief device.

5. The relief device of claim 1 wherein the secondary bore is perpendicular with the main axis of the relief device.

6. The relief device of claim 1 wherein the plug is a non-vent plug.

7. The relief device of claim 6 wherein the non-vent plug is filled with a fuse metal.

8. A relief device for a high-pressure gas container, comprising:

a main body having a generally uniform outer circumference and that defines a primary bore, the primary bore in fluid communication with an interior volume of the high-pressure gas container;

a spud assembly seated in the primary bore, the spud assembly including a rupture disc that relieves to the atmosphere the contents of the container when said container reaches a certain pressure, said rupture disc located within the primary bore and within the outer circumference, the spud assembly and rupture disc fixedly attached;

a shear ring in communication with the rupture disc; and a plug in communication with the spud assembly, the plug, when engaged with the spud assembly, forcibly engaging the shear ring against the rupture disc;

wherein, when the rupture disc expands, the shear ring ruptures the rupture disc and the contents of the container relieve to the atmosphere through the plug; and wherein the main body and spud assembly are welded.

9. The relief device of claim 8 wherein the rupture disc and spud assembly are welded.

10. The relief device of claim 8 wherein the primary bore is concentric with the main axis of the relief device.

11. The relief device of claim 8 wherein the plug is a non-vent plug.

12. The relief device of claim 11 wherein the non-vent plug is filled with a fuse metal.

* * * * *